Feb. 14, 1939.   L. V. LUCIA   2,147,376
AUTOMATIC REGULATING MEANS FOR TIMING DEVICES
Original Filed Sept. 28, 1934   2 Sheets-Sheet 1
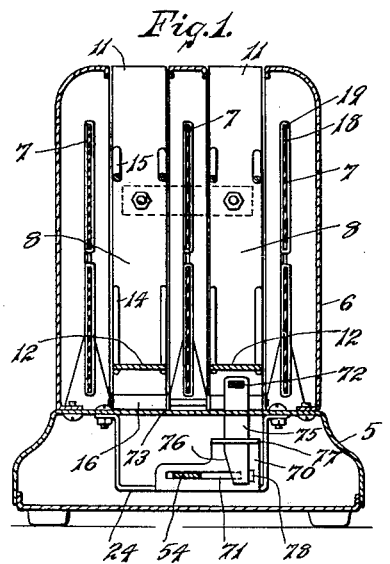
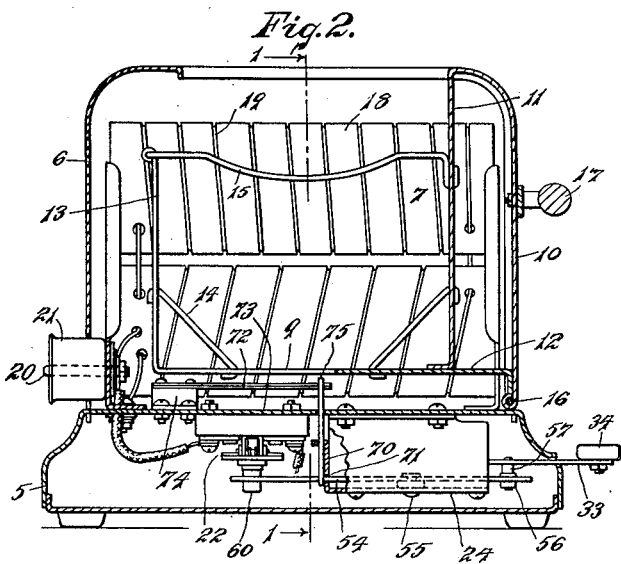
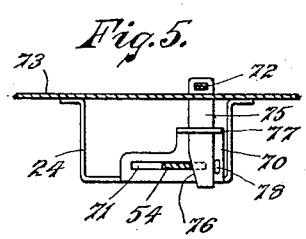
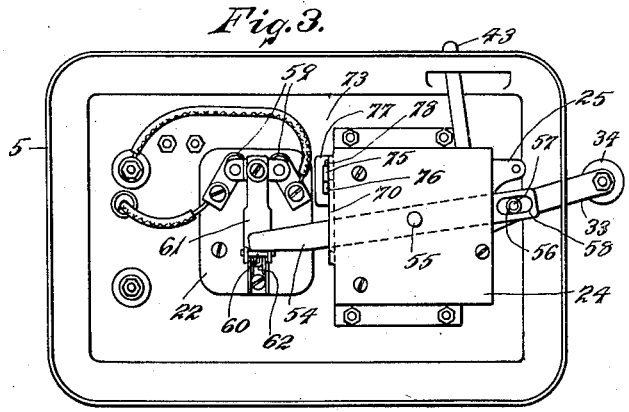
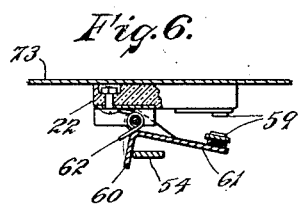
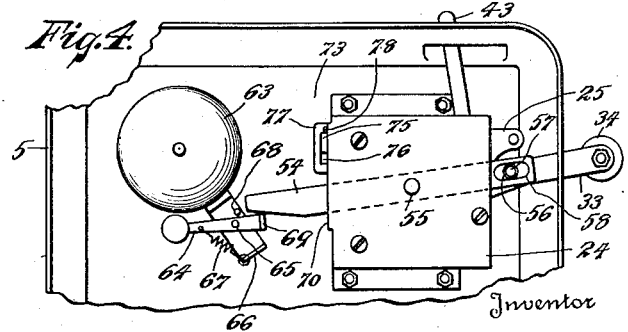
Inventor
Louis V. Lucia Feb. 14, 1939.　　　　L. V. LUCIA　　　　2,147,376
AUTOMATIC REGULATING MEANS FOR TIMING DEVICES
Original Filed Sept. 28, 1934　　2 Sheets—Sheet 2

Inventor
Louis V. Lucia

Patented Feb. 14, 1939

2,147,376

UNITED STATES PATENT OFFICE 2,147,376

AUTOMATIC REGULATING MEANS FOR TIMING DEVICES

Louis V. Lucia, West Hartford, Conn., assignor, by mesne assignments, to McGraw Electric Company, Chicago, Ill., a corporation of Delaware Continuation of application Serial No. 745,968, September 28, 1934. This application May 3, 1938, Serial No. 205,817

14 Claims. (Cl. 219—19)

This invention relates to automatic regulating means for timing devices such as commonly used on toasters, grilles, waffle irons and other similar apparatus, and constitutes means for regulating timing devices, for such apparatus, which are of a different type than those described in connection with my invention set forth in my application, Serial No. 508,340, filed January 12, 1931, Patent No. 2,036,178.

The invention claimed in my above mentioned application, is especially intended for use in connection with variable speed timing devices of a special design, while the instant invention is intended for use in connection with commonly used timing devices of standard design which operate at a constant speed. The purpose of the invention being the same; namely, to vary the timing period in proportion to the temperature of the cooking device.

As can be easily understood from the descriptions in my above mentioned application, and also in my later application Serial No. 731,480, filed June 20, 1934, it is especially desirable to regulate the operation of the timing device so that the timing period for the cooking operation is varied to correspond with the variations in temperature in the cooking device itself. Where ordinary timing devices are used, the timing period is constant while the temperature of the cooking device will vary for the different cooking operations so that, in such cases, the timing period will not accurately correspond with the cooking temperature and therefore uneven results will be obtained.

While the invention disclosed in the above mentioned applications will accomplish the desired results by regulating the speed of the timing devices to correspond with the cooking temperatures, there are a number of other standard timing devices on the market in which the speed is not variable and consequently my previous invention is not applicable thereto.

It is, therefore, an object of this invention, to provide means whereby said timing devices may be regulated to correspond with the temperature of the cooking device regardless of the speed of the timing device, but by automatically varying the degree to which the said timing devices are wound when their operation is started.

A further object of my invention is to provide means whereby the degree to which the timing device may be wound preparatory to the operation thereof, is automatically varied to correspond with the actual temperature within the cooking chamber of the cooking device.

A further object is to provide means whereby a predetermined degree of cooking may be obtained regardless of the exact time required and a further object is to provide means by which either the source of heat is cut off or a signal is given when the predetermined degree of cooking has been completed.

Further objects of my invention may be readily understood from the foregoing description and also from the accompanying drawings in which:

Figure 1 is a view in central vertical section, on line 1—1 of Figure 2, showing the use of a timing device comprising my invention as applied to an electric toaster; the timing mechanism not being shown therein.

Figure 2 is a side view of the same in central vertical section; no part of the timing device other than the winding lever being shown.

Figure 3 is a bottom view of the toaster with the bottom plate thereof removed.

Figure 4 is a similar view showing the application of the same timing device to ring a bell.

Figure 5 is a fragmentary view showing my improved regulating means in the position which it would take when the cooking device is heated.

Figure 6 is a fragmentary view showing a detail of the electric switch.

Figure 7:
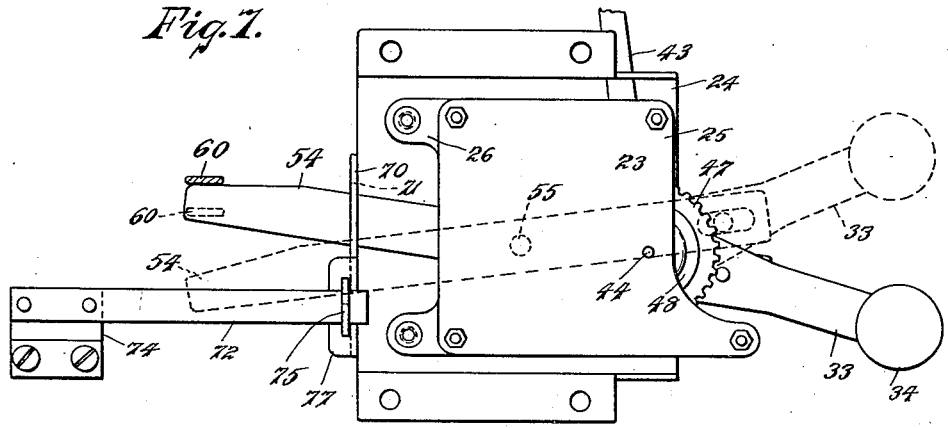
Figure 7 is a plan view on an enlarged scale of the timing device comprising my invention.
Figure 8:
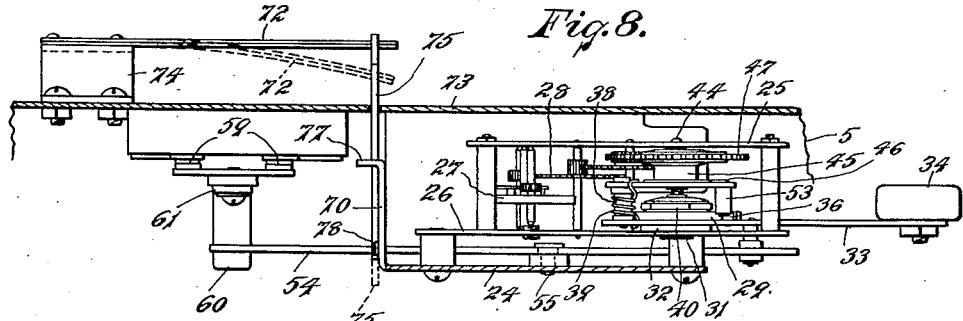
Figure 8 is a similar view showing the same elements in side elevation and showing, in dotted lines, the position of the thermostatic element when heated.

In order that the purpose of my invention may be clearly understood to begin with, I will first describe the application of my invention to an electric toaster.

As illustrated in the drawings, the numeral 5 denotes the base of an electric toaster on which is mounted a casing 6. Heating elements 7, of suitable construction, are supported within the said casing forming a cooking chamber 8 between said elements. In the structure shown, the toaster is constructed so that two slices of bread may be toasted at the same time and, therefore, three heating elements are used forming two cooking chambers. My invention is applicable either to a single or multiple slice device.

Bread supports 9 are provided which, as shown, are constructed from a member 10 that is formed to provide a side wall 11. A supporting bar 12 is secured to this wall and has an upwardly turned portion 13 forming the opposite side wall of the bread support. Wire guides 14 and 15 are provided to hold the bread slice in proper relation to the heating elements. As shown, the said bread supports are hinged as at 16 in order that they may be swung outwardly by grasping a handle 17 and thus moving the bread slices into or out of said cooking chamber.

Each of the heating elements are constructed of sheets of insulating material 18 on which is wound an electrical resistance wire 19, which wire is suitably connected, in a manner well known by those skilled in the art, to terminal pins 20 which extend within a plug guard 21 and are positioned to be received by a common electric plug for supply of current to said elements.

In the device illustrated in Figures 1, 2 and 3 of the drawings, said resistance wires are connected to said terminals thru an electric switch 22 which is located in the base of the toaster.

A timing device 23, of common construction but to which my invention is applied, is located in the base of said toaster and mounted in a housing 24; this timing device is mounted in a frame composed of an upper plate 25 and a lower plate 26 and has the usual escapement 27 which is driven thru a train of gears 28 by means of a main driving spring 29 which is connected to an adjustable driving unit 30. This driving unit as clearly illustrated in Figure 10 of the drawings comprises a stud 31 which is anchored to the bottom plate 26. On this stud is mounted, over a spacing washer 32, a winding lever 33 having a handle 34. A main driving spring 29 is anchored to the stud 31 as at 35 and the outer end of said spring is secured to the winding lever by means of a stud 36. A pawl 37 (see Figure 9) is pivotally mounted to one end of the winding lever on a post 38 and resiliently forced in one direction by means of a spring 39. A releasing cam 40 is rotatably mounted on the stud 31 and frictionally held in fixed position thereon by means of friction discs 41 and 42. The said cam has an adjusting handle 43 extending therefrom by means of which the cam may be selectively positioned. A spindle 44 is rotatably mounted on the axis of the stud 31 and between the said stud and the plate 25. A hub 45 is secured to said spindle and a driving ratchet 46 is secured to said hub on the same plane with the pawl 37. A driving gear 47 is rotatably mounted on said hub and held in frictional engagement and rotatable therewith by means of friction washers 48 and 49 which are anchored to said hub in order to rotate therewith.

Figure 9:
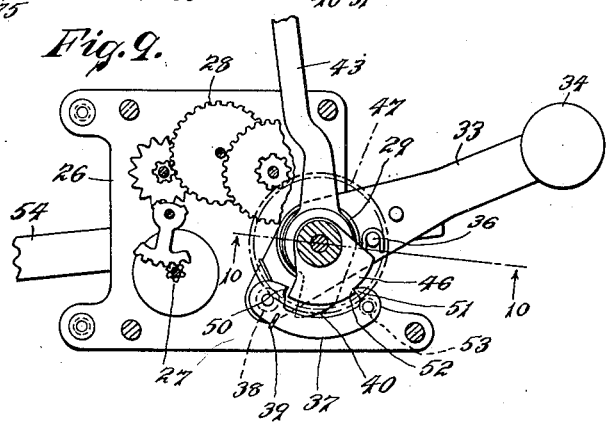
Figure 9 is a plan view of the timing mechanism with some of the parts thereof removed and showing the driving unit in its starting position.
Figure 10:
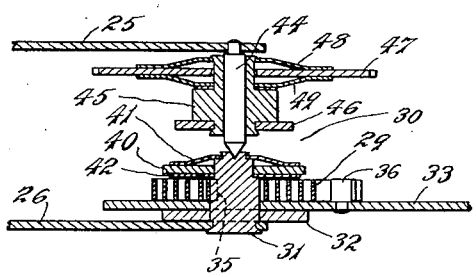
Figure 10 is a view in section on an enlarged scale of a portion showing the driving unit of the timing mechanism on line 10—10 of Figure 9.

The operation of said timing device will now be described, it being understood that in its normal position, and when the winding lever is in the position shown in Figure 7 of the drawings, the ratchet is in a position rearward of the position in which it is shown in Figure 9 of the drawings. When the winding lever 33 is moved towards its starting position, as shown in Figure 9, the point 50 on the pawl 37 engages the back of the ratchet 46 and moves the ratchet to the position shown. At the same time, the lever 33 winds the main spring 29. The lever is now in its starting position and, when released, the point 51 of the pawl will engage the notch 52 of the ratchet, being forced into engagement therewith by the spring 39. The said ratchet is now driven by the unwinding action of the main spring and the same, being rigidly connected to the hub 45 to which the friction washers 48 and 49 are also rigidly connected, will drive the main gear 47 and thus operate the entire timing mechanism.

The length of the timing period is controlled as follows:

The unwinding of the main spring 29 will tend to move the winding lever back to its normal position but this movement is delayed by the timing mechanism. When the timing period has elapsed, the roller 53, depending from the pawl 37, will engage the surface of the cam 40 and cause the pawl to disengage from the ratchet. The lever 33 is thus released and the same will snap back to its normal position releasing the remaining tension in the main spring 29 caused by the movement of lever 33 and thus terminating the time period and the operation of the timing device. It will be readily seen that the time period can, therefore, be lengthened or shortened by manually setting the cam 40, thru the handle 43, nearer or farther from the roller 53 when the lever 33, pawl 37 and ratchet 46 are in the starting position of their driving operation. The same cam is retained in any position in which it is set by means of the tension washers 41 and 42 which are rigidly secured to the anchored stud 31.

As shown in the drawings, a lever 54 is pivoted at 55 to the housing 24. A roller 56 is mounted to the winding lever 33 by means of a stud 57 and extends thru a slot 58 in said lever 54 so that when the winding lever is released, at the end of a timing period, the said lever 54 will be operated to separate the contacts 59 of an electric switch 22 by engaging the extension 60 of the switch bar 61 and thus cut off the supply of electric current to the heating elements or when the operation of the timing device is started, the contacts 59 are brought together, by the tension of the spring 62 acting on the switch bar 61, thus closing the electric circuit and supplying current to the heating elements during the internal of the timing period.

If desired, the operation of the said lever 54 may be applied to give a signal at the expiration of the timing period by the use of a bell ringing device clearly shown in Figure 4 of the drawings. This device consists merely of a bell 63 which is mounted in place of the switch 22. A hammer is mounted on a bar 64 and pivoted as at 65 to a bracket 66 and retained in a position, away from said bell, by means of a spring 67 which will tend to pull said bar against the stop 68. An extension 69 is provided at the end of the bar 57 and is disposed in the path of the lever 54 so that when the said lever is operated, by the releasing of the winding lever 28, it will strike the said extension 62 and cause the hammer to ring the bell.

That part of the mechanism shown which involves my invention will now be described:

An extension 70 is provided on the housing 24. This extension has a guide slot 71 therein thru which the lever 54 extends.

A heat responsive member, such as a bi-metallic thermostatic bar 72, is mounted on the floor 73 of one of the cooking chambers 8 by means of a bracket 74. A stop member 75, having an inclined stop surface 76, is loosely mounted on said thermostatic bar by means of a slot therein thru which said bar extends. Said stop member extends thru a slot in the floor 73, thru a guide slot 70 in the portion 77 of the extention 70 and past the slot 71 so that the stop surface 76 thereof is disposed across the said slot and in the path of the lever 54. An abutment 78 is formed in the portion 77 to support the stop member 75 against motion when pressure is applied thereto by the lever 54.

The operation of the mechanism comprised in my invention is as follows:

Assuming that the electric toaster, as shown in the drawings, is in a cold state and that a source of electric current is connected thereto by means of a plug which is attached to the terminal pin 20. When the first cooking operation is to be performed therein, the bread supports are swung outwardly, a slice of bread is deposited on each of said supports and they are then returned to the position shown in Figure 2 of the drawings. The winding handle 34 of the timing mechanism is now moved to the position shown in dotted lines of Figure 7 and released. This movement of the winding lever will swing the lever 54 against the stop surface 76 of the stop member as shown clearly in Figure 5 of the drawings. The stopping action on the lever 54 will limit the winding movement of the lever 33. The movement of said lever 54 will cause the switch bar extension 60 to be released by said lever and forced, by means of the spring 62, so that the contacts 59 will be brought into closed position; thus closing the electric circuit thru said switch and heating the elements 7. The timing device will operate, as above described, until the pawl 37 is disengaged from the ratchet 46 by means of the cam 40 at which time the lever 33 is released and will quickly move to its normal position and operate the lever 54 to open the switch or, in the application shown in Figure 4 of the drawings, ring the bell and the timing period for the cooking operation is terminated.

It will be readily understood that; as each succeeding cooking operation is performed in the cooking device, the temperature within the cooking chambers will naturally rise so that the succeeding cooking operation will not require the same length of time period as the preceding operation on account of the varying degree of temperature in the cooking chambers. As the temperature in the cooking chambers increases, the thermostatic bar 72 will flex downwardly, as shown in the drawings, thus lowering the stop member 75 and moving the stop surface thereon nearer to the lever 54 so that when the next cooking operation is performed, and the stop lever 54 is moved against the said stop surface, it will be stopped at a point slightly ahead of the point where the said lever was stopped in the preceding operation, when the temperature in the cooking chamber was lower, thus limiting the winding limit of the winding lever 33 so that the ratchet 46 will come to a stop at a position slightly nearer to the cam 40 and thus shortening the time period.

If a delay should occur between the successive cooking operations, the toaster will naturally tend to cool and the thermostatic bar will return towards its normal position, raising the stop member, and lengthening the time period by permitting slightly further travel of the lever 54 and consequently of the winding lever 33.

From the above description, it will be clearly understood that I have provided means whereby the time period provided by a clock mechanism will be automatically varied, to correspond to the temperature of a cooking device, by thermostatically controlling the distance traveled by said mechanism during the operation thereof by means of regulating the degree to which the said clock mechanism is wound, and thus automatically varying the time period by controlling the starting point thereof with relation to a manually adjustable time period terminating means.

While I have shown and described my invention as applied to the structure illustrated in the drawings, it is desired to have it understood that the said invention may be applied to different forms of timing devices which may be used in various types of cooking devices without departing from the scope of the invention as set forth in the appended claims.

The present application is a continuation of my application Serial No. 745,968, filed September 28, 1934.

I claim:

1. An automatic toaster including an electric heating element, a control switch therefor biased to closed position and means for initiating and for terminating a toasting operation, said means including a mechanical timer having a power spring and a retarding gear train, a pivotally mounted handle to which one end of said power spring is connected, said handle being normally held by said power spring at one end of its path of movement and being actuatable away therefrom to wind said spring, a ratchet frictionally connected with said gear train, a pawl mounted on and movable with said handle and normally biased into engagement with said ratchet, a lever arm connected with said handle and effective to hold said control switch in open position when the handle is at said one end of its path of movement and a pawl release cam for effecting disengagement of the pawl from the ratchet to cause quick return movement of said handle to its initial position and opening movement of said control switch.

2. An automatic toaster including an electric heating element, a control switch therefor biased to closed position and means for initiating and for terminating a toasting operation, said means including a mechanical timer having a power spring and a retarding gear train, a pivotally mounted handle to which one end of said power spring is connected, said handle being normally held by said power spring at one end of its path of movement and being actuatable away therefrom to wind said spring, a ratchet frictionally connected with said gear train, a pawl mounted on and movable with said handle and normally biased into engagement with said ratchet, a lever arm connected with said handle and effective to hold said control switch in open position when the handle is at said one end of its path of movement and thermally controlled means engageable by said lever arm during spring winding movement of said handle to limit its movement in a spring winding direction.

3. A device as set forth in claim 1 in which the pivotal mounting of the handle is coaxial with the mounting of the ratchet, of the pawl release cam and of the power spring.

4. An automatic toaster including an electric heating element, a control switch therefor biased to closed position and means including a single directly manually-actuatable pivotally-mounted lever arm for initiating and for terminating a toasting operation, said means including further a mechanical timer having a spring and a retarding gear train, one end of said spring being connected with said pivotally mounted lever arm to cause winding up of the spring by movement of said lever arm in one direction, a second pivotally mounted lever arm mechanically connected with said first named lever arm normally held in engagement with said control switch by said spring to hold said switch in open position, a ratchet mounted coaxially with said first named lever arm having a friction connection with said gear train, a pawl mounted on said first named lever arm and engaging said ratchet to cause operation of said gear train by said spring and a manually adjustable pawl release cam for operatively engaging said pawl to disengage it from said ratchet and cause the power spring to move said control switch to its open position under full power of said spring.

5. An automatic toaster comprising an electric heating element, a control switch therefor biased to closed position, a mechanical timer having a power spring and a retarding gear train, a handle having one end of said power spring connected therewith and normally held thereby in a limiting position, a lever having an operative connection with said handle and normally operatively engaging said control switch to hold the latter in open position, movement of said handle in a direction away from said limiting position causing closing of said control switch and winding of said power spring, the power spring then effecting gear-train-delayed return movement of said handle, a cam surface and means operatively associated with said handle for engaging said cam surface to cause disengagement of said handle and power spring from said gear train with resultant quick movement of said handle to its limiting position and opening of said control switch.

6. An automatic toaster comprising an electric heating element, a control switch therefor biased to closed position, a mechanical timer having a power spring and a retarding gear train, a handle having one end of said power spring connected therewith, a lever arm mechanically connected with said handle engageable with said control switch and effective to normally hold said switch in open position to thereby limit movement of said handle in one direction, a pawl and ratchet connection between said handle and said gear train to cause gear-train-delayed return of said handle in said one direction after spring-winding movement of said handle in the other direction and a manually-adjustable cam surface operatively engageable by said pawl to effect disconnection of said handle from said gear train to cause quick return of said handle to its switch opening position.

7. An automatic toaster comprising an electric heating element, a control switch therefor biased to closed position, a mechanical timer including a power spring, a retarding gear train and means operatively connecting said spring and gear train including ratchet, a pawl and a friction coupling, a pivotally mounted winding lever having one end of the power spring connected therewith and having the pawl mounted thereon, a pivotally mounted lever arm connected with the winding lever to move therewith and normally operative to hold said control switch in open position to limit spring-unwinding movement of said winding lever, spring-winding movement of said winding lever causing opening of said control switch, a thermally-controlled element having an inclined surface adapted to be engaged by said lever arm during spring winding movement of said winding lever to limit the winding of said spring and a manually adjustable cam operatively engageable by said pawl during the spring unwinding movement of said winding lever to cause disengagement of the winding lever and spring from said retarding gear train with consequent quick return of the winding lever to its initial position and opening of said switch by said lever arm.

8. An automatic toaster comprising an electric heating element, a control switch therefor biased to closed position, a mechanical timer including a spring, a retarding gear train and means operatively connecting said spring and said gear train including a ratchet, a pawl and a friction coupling, a winding lever having one end of said spring connected therewith and having the pawl mounted thereon, means actuatable by said winding lever to normally hold the switch in open position, said last named means being effective to limit the spring-unwinding movement of said winding lever, a thermally controlled stop member engageable with said last named means for limiting the spring-winding movement of said winding lever and manually actuatable means for causing disengagement of the spring and winding lever from the retarding gear train for quick return of the winding lever to switch opening position under full power exertable by said spring.

9. A device as set forth in claim 7 in which the friction coupling, winding lever, manually-adjustable cam and the ratchet are coaxially mounted.

10. An automatic toaster comprising an electric heating element, a control switch therefor biased to closed position, a mechanical timer including a power spring, a retarding gear train and means operatively connecting said spring and said gear train including a ratchet, a pawl and a friction coupling, a winding lever having one end of said power spring connected therewith and having the pawl mounted thereon, means actuatable by said winding lever to normally hold the switch in open position, said last named means being effective to limit the spring-unwinding movement of said winding lever, a thermally controlled stop member engageable with said last named means for limiting the spring-winding movement of said winding lever and manually adjustable means operatively engageable by said pawl in its movement during unwinding of the spring for effecting disengagement of said pawl from said ratchet to thereby terminate a toasting operation.

11. An automatic toaster comprising an electric heating element, a control switch therefor biased to closed position, a mechanical timer including a power spring, a retarding gear train and means operatively connecting said spring and said gear train including a ratchet, a pawl and a friction coupling, a winding lever having one end of said power spring connected therewith and having the pawl mounted thereon, means actuatable by said winding lever to normally hold the switch in open position, said last named means being effective to limit the spring-unwinding movement of said winding lever, a thermally controlled stop member, engageable with said last named means for limiting the spring-winding movement of said winding lever and manually adjustable means including a cam mounted coaxially with said winding lever and operatively engageable with said pawl to thereby cause termination of a toasting operation by opening of said switch.

12. An automatic toaster comprising an electric heating element, a control switch therefor biased to closed position, a mechanical timer including a power spring, a retarding gear train, a friction coupling, a ratchet and a pawl, a winding lever supporting said pawl and mounted coaxially with said power spring, said friction coupling and said ratchet, one end of said power spring being directly connected to said winding lever, a lever arm having a pin and slot connection with said winding lever to be actuated thereby and normally held by said power spring in a position to hold said switch in open position, thermally controlled means engageable by said lever arm to limit the degree of winding of said power spring and a manually adjustable cam mounted coaxially with said winding lever and operatively engageable with said pawl to effect disengagement of said power spring and winding lever from said gear train to thereby cause quick movement of said lever arm to its switch opening position.

13. An automatic toaster including an electric heating means, a control switch for said heating means biased to closed position, means to initiate a toasting operation and means to terminate a toasting operation, said terminating means comprising a mechanical timer having a power spring and a retarding gear train, means operatively connecting said power spring and said control switch to normally hold said switch in open position and movable in one direction to wind up said power spring and cause closing of said switch and manually adjustable means for effecting disconnection of said power spring from said gear train during unwinding movement of said power spring to cause quick return movement of said means operatively connecting the power spring and said control switch and quick opening of said control switch.

14. An automatic toaster comprising an electric heating element, a control switch therefor biased to closed position, a mechanical timer having a power spring and a retarding gear train, a handle pivotally mounted for rotative movement connected to said power spring and normally held thereby at one end of its rotative movement, a pivotally mounted lever arm operatively connected with said handle and normally held by said power spring in operative engagement with said control switch to hold the latter in open position, rotative movement of said handle away from said end position causing disengagement of said lever arm from said control switch and winding of said power spring, the power spring, on release of said handle, effecting gear-train-delayed return rotary movement of said handle, a manually adjustable cam and means operatively associated and movable with said handle for engaging said cam to effect disengagement of said handle and said power spring from said gear train to cause the power spring to move said handle quickly to said end position and quick opening of said control switch.

LOUIS V. LUCIA.